(12) United States Patent
Neri

(10) Patent No.: US 7,127,313 B2
(45) Date of Patent: Oct. 24, 2006

(54) PRODUCT CONFIGURATION SYSTEM

(75) Inventor: Armando Neri, Bologna (IT)

(73) Assignee: Tree's Co. S.r.l., Casalecchio di Reao (IT)

( * ) Notice: Subject to any disclaimer, the term of this patent is extended or adjusted under 35 U.S.C. 154(b) by 0 days.

(21) Appl. No.: 11/038,467

(22) Filed: Jan. 21, 2005

(65) Prior Publication Data

US 2005/0246394 A1    Nov. 3, 2005

(30) Foreign Application Priority Data

Jan. 23, 2004   (IT) ........................ BO2004A0023

(51) Int. Cl.
*G06F 19/00*   (2006.01)
*G06F 1/00*    (2006.01)

(52) U.S. Cl. ............... 700/103; 700/19; 703/7

(58) Field of Classification Search ............... 700/103, 700/99, 106, 97, 108, 19, 182, 96, 180; 703/1, 703/2, 7; 713/100; 705/8, 7, 10, 400; 318/567
See application file for complete search history.

(56) References Cited

U.S. PATENT DOCUMENTS

| | | | |
|---|---|---|---|
| 5,825,651 A | 10/1998 | Gupta et al. | |
| 6,243,614 B1* | 6/2001 | Anderson | 700/108 |
| 6,725,257 B1* | 4/2004 | Cansler et al. | 709/219 |
| 2004/0098151 A1* | 5/2004 | Carlucci et al. | 700/95 |
| 2005/0038542 A1* | 2/2005 | Kern | 700/105 |

FOREIGN PATENT DOCUMENTS

| | | |
|---|---|---|
| CA | 2 432 631 A1 | 12/2004 |
| WO | WO 01/33315 A2 | 5/2001 |
| WO | WO 03/021393 A2 | 3/2003 |

* cited by examiner

*Primary Examiner*—Kidest Bahta
(74) *Attorney, Agent, or Firm*—Berenato, White & Stavish

(57) ABSTRACT

A product configuration system; the system has a memory device, in which all possible product manufacturing alternatives are stored; a display device for graphically displaying all possible product manufacturing alternatives in the form of a product tree defined by a set of paths defined by a number of series or parallel segments; and a selection device for selecting the product configuration by selecting a path, on the product tree, having a start or input point and an end or output point.

23 Claims, 3 Drawing Sheets

PRODUCT CONFIGURATION SYSTEM

This application claims the benefit under 35 U.S.C. § 119 of Italian Patent Application No. BO2004A 000023 filed on Jan. 23, 2004, which is hereby incorporated by reference.

FIELD OF THE INVENTION

The present invention relates to a product configuration system.

DESCRIPTION OF RELATED ART

At present, the market offers various types of product configuration systems, i.e. systems enabling manufacturers to obtain, for each catalogued product, a precise manufacturable configuration for presentation to customers, and which, once a given product configuration is ordered by the customer, automatically generate a list of the materials and processing required to produce the product, and the drawings and manuals relative to the required product configuration.

Currently marketed product configuration systems, however, are difficult to use, by representing the possible variations of each product in the form of complex mathematical functions, and provide for only partly tackling and solving the problems involved (configuration, life cycle, supply, management). In other words, they normally constitute no more than partial solutions made to measure for individual firms, which call for refining and high-cost customization, and which fail to provide a complete overview permitting overall data management of the firm. Moreover, currently marketed systems are inefficient in designing new product configurations, in relating data from different departments, and in making design choices to meet given market demands, are difficult to run, and fail to provide for effectively keeping track of the history of each individual product. The importance of product history is in direct proportion to the extent to which the firm's product is customized, in that any design work resulting from after-sale, customer-requested alterations must be congruous with the customer's existing product.

SUMMARY OF THE INVENTION

It is an object of the present invention to provide a product configuration system which is cheap and easy to produce, and which, at the same time, provides for eliminating the aforementioned drawbacks.

According to the present invention, there is provided a product configuration system, as claimed in the accompanying claims.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
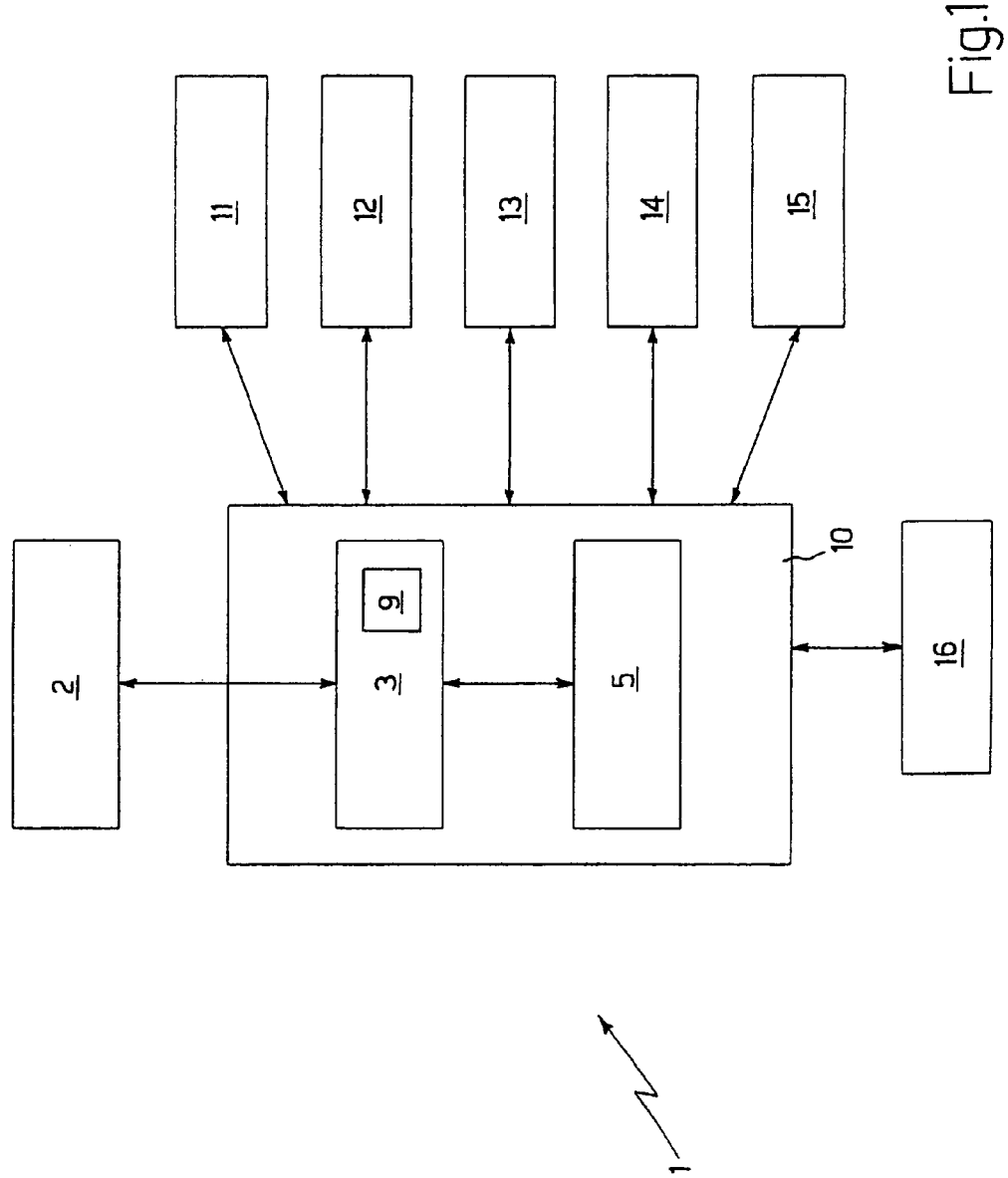
FIG. 1 shows a block diagram of a product configuration system in accordance with the present invention.

Number 1 in FIG. 1 indicates a product configuration system, which is normally implemented in a computer-executed software package.

System 1 comprises a memory device 2, in which possible product manufacturing alternatives are stored; and a display device 3 for graphically representing the possible product manufacturing alternatives in the form of a product tree 4 (FIG. 2) comprising a set of paths defined by a number of series or parallel segments. System 1 also comprises a selection device 5 for selecting the product configuration by selecting, on product tree 4, a path 6 (FIG. 3) having a start or input point 7 and an end or output point 8. Needless to say, start point 7 and end point 8 of a path 6 defining a given product configuration may or may not coincide with the ends of product tree 4. That is, path 6 may extend along the whole of product tree 4 or only along part of it (possibly comprising a number of non-consecutive portions).

Figure 2:
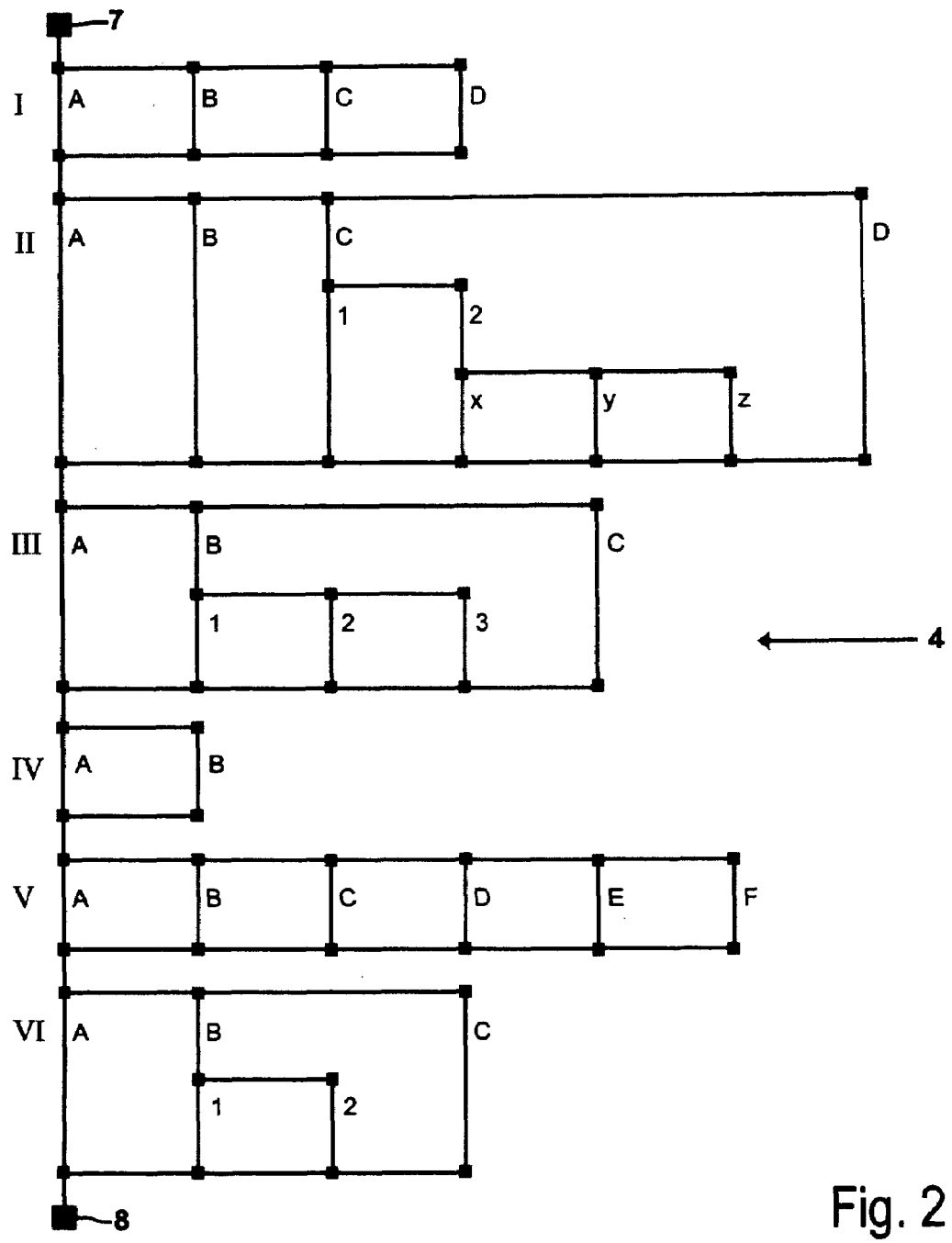
FIG. 2 shows an example display of a product tree generated by the FIG. 1 product configuration system.
Figure 3:
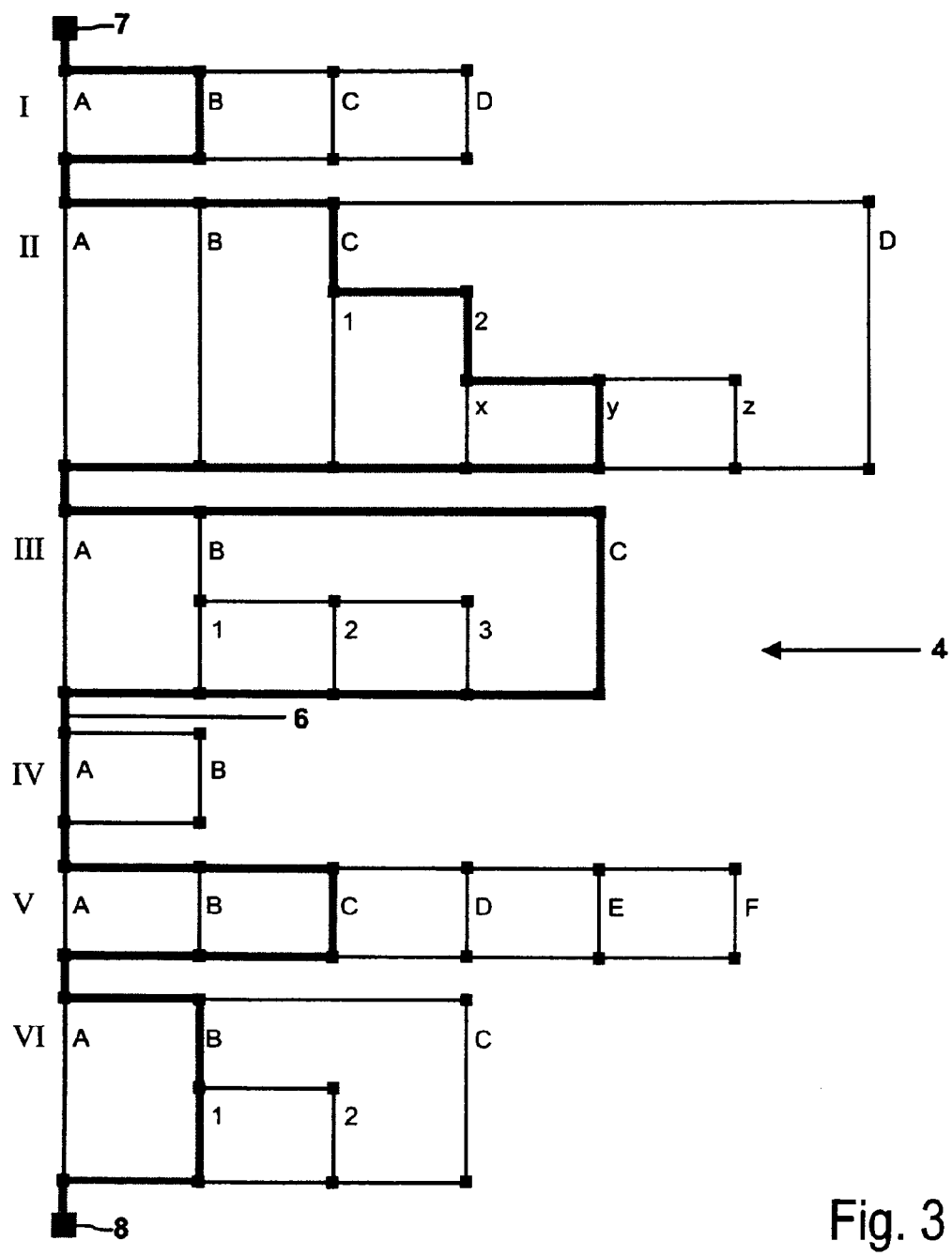
FIG. 3 shows an example of a selection made from the FIG. 2 product tree.

In the preferred embodiment shown in FIGS. 2 and 3, product tree 4 extends in a plane defined by a horizontal axis and a vertical axis, and shows a succession of product characteristics along the vertical axis, and, along the horizontal axis, the possible variations of each product characteristic. Path 6 therefore extends vertically and preferably downwards.

With reference to the FIG. 2 example, product tree 4 provides for configuring six product characteristics (indicated I–VI), and for selecting from at least two alternatives for each product characteristic I–VI. For example, alternative A, B, C or D may be selected for characteristic I; alternative A or B may be selected for characteristic IV; alternative A, B, C or D may be selected for characteristic II; in the event alternative C is selected for characteristic II, a further selection can be made between alternatives C1 and C2; and, in the event alternative C2 is selected, a further section can be made between alternative variations x, y and z.

FIG. 3 shows an example path 6, which extends vertically downwards from a start or input point 7 to an end or output point 8, and which corresponds to a product configuration comprising alternative B for characteristic I, alternative C2y for characteristic II, alternative C for characteristic III, alternative A for characteristic IV, alternative C for characteristic V, and alternative B1 for characteristic VI.

When an alternative for a given characteristic, i.e. a given branch of the path, is selected, one or more values to be assigned to one or more parameters of the characteristic can also be inserted.

A common condition when configuring a product is that not all theoretically feasible alternatives are compatible, and certain choices necessarily impose others downstream. From the operating standpoint, this is achieved by creating bonds between one upstream alternative and one or more downstream alternatives. The bonds may be either positive (i.e. the upstream alternative necessarily also imposes the downstream alternative) or negative (i.e. the upstream alternative rules out the downstream alternative), and may be represented integrally by all and only the possible paths on product tree 4, in which case, selection is made by simply following one of possible paths 6, e.g. path 6 in FIG. 3. The bonds may also be used in dynamic selection mode, in which case, as path 6 proceeds along product tree 4, display device 3 dynamically modifies the part of product tree 4 downstream from the current point of path 6 as a function of the course of path 6. For example, in the case of product tree 4, selection of alternative B2 for characteristic III may rule out selection of alternative D for characteristic V, so that, when alternative B2 for characteristic III is selected, display device 3 deletes alternative D from characteristic V. This process of dynamically deleting from the display one or more alternatives of a characteristic, or one or more characteristics of product tree 4, as a function of upstream configuration choices is referred to as "masking". Portions of product tree 4 may also be "masked" as a result of selecting alternatives not directly related to physical characteristics of the product for configuration, e.g. as a result of selecting a given sales market or production/processing division.

In a preferred embodiment, display of certain portions of product tree 4 may be enlarged or shrunk by "zooming", which is essential in the case of extensive product trees 4 for which a complete display would require too large a display area.

Needless to say, characteristics and alternatives may be arranged along the vertical and horizontal axes respectively as desired by the user; and the orientation of product tree 4 may be varied by representing the succession of product characteristics along the horizontal axis, and possible variations of a given product characteristic along the vertical axis.

It should be pointed out that display device 3 and selection device 5 can operate over both local and geographic networks by means of an http communication protocol, thus ensuring full remote access to display and selection devices 3 and 5 over the Internet network.

Display device 3 comprises a processing device 9 for processing and recombining the information stored in memory device 2 into a set of functional parts combinable by means of elementary logic functions. In other words, processing device 9 translates the possible product production alternatives stored in memory device 2 into a product tree 4 (i.e. a graphic representation) displayed by display device 3. Moreover, selection device 5 provides for analysing and translating a path 6 selected on product tree 4 (i.e. successively selected series and parallel graphic elements) into a textual logic expression.

Display device 3 and selection device 5 form part of a configuration module 10, which is connected to a technical documentation module 11 for generating the technical documentation of a selected path 6 or configuration; to a CAD connection module 12 for integrating the data of configuration module 10 with CAD data (typically parametric CAD data); to a CRM module 13 for memorizing the development of each product handled by configuration module 10; to an ERP connection module 14 for integrating the data managed by configuration module 10 with ERP (i.e. production) data; and to a software generation module 15 for generating the product control software of a selected path 6 or configuration. Some of modules 11–15 may obviously not be used or installed, depending on the characteristics of the products involved (e.g. the products may not require software programming) and depending on user choice.

Technical documentation module 11 preferably employs a number of parts in XML format, which are assembled according to the configuration of a product to generate the corresponding technical documentation.

Configuration module 10 is also connected to a PLM module 16 for generating specific configuration views for each company division. More specifically, PLM module 16 generates a first view for Sales, which simply shows the product configuration as a whole in functional terms, with no reference to the document structure underlying individual functional features; a second view for Design, which shows the product configuration as a whole in terms of functions; and a third view for Production, which shows the specific customer-requested product configuration. It should be pointed out that Sales need to know the product configuration as a whole in functional terms to provide customers with all possible alternatives, but have no interest in knowing the document structure (drawings, manuals, two-/three-dimensional assemblies, mechanical analyses, etc.) underlying individual functional features; whereas Design needs to known the product configuration as a whole in terms of functions to determine at any time the possible consequences of modifying a given function, or to assess the effect of incorporating a new option in the product as a whole. Finally, Programming and Production simply need to know the specific customer-requested product configuration to program and actually produce it.

By means of PLM module 16, system 1 provides for graphically displaying fixed parts, i.e. independent of configuration choices, and variable parts, i.e. dependent on configuration choices. By differentiating between fixed and variable parts, decisions concerning the manufacture of individual parts can be made faster as compared with current methods, and independently of customer purchase orders. That is, fixed parts can be manufactured in advance of customer purchase orders, and only parts "selected" by specific customers manufactured as orders are received, thus eliminating storage of seldom-used parts.

In configuration module 10, the succession of product characteristics is expressed as a succession of minimum functional parts, each of which refers to an item/characteristic of the product, and is parametered internally. Each minimum functional part is assigned attributes to physically represent the company product, relationships by which to navigate company know-how, constraints to ensure creation of consistent configurations at all times, and documents customizable as a function of the configuration.

In other words, the design method supported by the logic implemented by configuration module 10 is based on a minimum functional part concept, which, in design terms, means the company product as a whole can be configured by combining internally parametered elementary functions (which, in actual fact, may even be of ample scope). Each "minimum functional part" refers to a logic item, which may contain parameterizations of all types, and which is assigned attributes, relationships, constraints, and documents (drawings, manuals, offers, . . . ); and each "minimum functional part" may be piloted by one or more parameters.

More specifically, the relationships between items are what provide for navigating company know-how (e.g. each physical part is assigned given processing jobs, each of which is assigned a cost related to a specific supplier); the constraints between items ensure creation of consistent configurations at all times (e.g. a model A part requires another exclusively model B part); the documents relating to the items are customized according to assigned parameter values; and the item attributes physically represent the product.

With this approach, partial or total configurations can be resolved on the basis of explicitly assigned parameters or by accepting a default value when possible. Even in the case of partial resolutions, the integrity of the configuration, as a function of the constraints incorporated in the product structure, is ensured.

"Minimum functional part" logic provides for reutilization of manufactured component parts. This logic is comparable with that of currently marketed products, which are based on a "macro function" concept and only partly provide for managing company know-how. Design on the basis of "macro function" logic involves working on the basis of differences, followed by customization and refinement, which, since variations form part of the product itself, rarely solves the problem of configuration. In the event of alterations or when incorporating alternatives, the only possible course of action is to operate on the basis of differences, in an attempt to "isolate" the element to be worked on afterwards, and then reconfigure the product with the former element, its new alternative, and the difference between this situation and the former. But, even if the process is not altogether impossible for the first alteration or variation, it is extremely complicated or any subsequent alterations.

The invention claimed is:

1. A product configuration system (1) comprising:
a memory device (2), in which possible product manufacturing alternatives are stored;
a display device (3) for graphically displaying possible product configurations in the form of a product tree (4) extending vertically downwards and comprising a set of paths, each of which corresponds to a possible product configuration; and
a selection device (5) for selecting a product configuration by selecting a path (6) on the product tree (4);
wherein the product tree (4) has a common start or input point (7) arranged at the top of the product tree (4) and a common end or output point (8) arranged at the bottom of the product tree (4) so as each path corresponding to a possible product configuration starts at the same common start point (7) and ends at the same common end point (8);
wherein the product tree (4) comprises a plurality of vertical levels, each of which corresponds to a product characteristic (I–VI) which can be selected from a number of alternatives (A–F);
wherein in a vertical level the alternatives for the same product characteristic (I–VI) are graphically represented by vertical lines arranged parallel each other;
wherein each vertical level has a top horizontal line and a bottom horizontal line, which bounds the vertical level;
wherein two adjacent vertical levels are graphically connected by a single vertical line connecting the bottom horizontal line of the upper level and the top horizontal line of the lower level; and
wherein the display device (3) comprises a processing device (9) for processing and recombining the information stored in the memory device (2) into a set of functional parts combinable by means of elementary logic functions, so as to translate the possible product manufacturing alternatives stored in the memory device (2) into the product tree (4); and the selection device (5) analyses the path (6) selected on the product tree (4), to translate the path (6) into a textual logic expression.

2. A system (1) as claimed in claim 1, wherein, as the path (6) proceeds along the product tree (4), the display device (3) dynamically modifies the part of the product tree (4) downstream from the current point of the path (6) as a function of the course of the path (6).

3. A system (1) as claimed in claim 2, wherein the part of the product tree (4) downstream from the current point of the path (6) is also modified dynamically as a result of selecting alternatives not directly related to physical characteristics of the product for configuration.

4. A system (1) as claimed in claim 3, wherein the part of the product tree (4) downstream from the current point of the path (6) is modified dynamically as a result of selecting a given sales market.

5. A system (1) as claimed in claim 3, wherein the part of the product tree (4) downstream from the current point of the path (6) is modified dynamically as a result of selecting the production/processing division.

6. A system (1) as claimed in claim 1, wherein bonds may be created between an upstream alternative and one or more downstream alternatives, and are either positive, whereby the upstream alternative necessarily also imposes the downstream alternative, or negative, whereby the upstream alternative rules out the downstream alternative.

7. A system (1) as claimed in claim 6, wherein, as the path (6) proceeds along the product tree (4), the display device (3) dynamically modifies the part of the product tree (4) downstream from the current point of the path (6) as a function of the course of the path (6) and of the bonds provided.

8. A system (1) as claimed in claim 7, wherein dynamic modification of the part of the product tree (4) downstream from the current point of the path (6) comprises masking portions of the product tree (4).

9. A system (1) as claimed in claim 1, wherein, upon selection of an alternative for a given characteristic, whereby a given branch of the path is selected, one or more values to be assigned to one or more parameters relating to the characteristic may also be inserted.

10. A system (1) as claimed in claim 1, wherein display of portions of the product tree (4) may be enlarged or shrunk by "zooming".

11. A system (1) as claimed in claim 1, and comprising a configuration module (10), in turn comprising the display device (3) and the selection device (5); a technical documentation module (11) for generating the technical documentation relating to a selected path (6) or configuration; and a CAD connection module (12) for integrating the data of the configuration module (10) with CAD data.

12. A system (1) as claimed in claim 11, and comprising a CRM module (13) for memorizing the development of each product handled by the configuration module (10).

13. A system (1) as claimed in claim 11, and comprising an ERP connection module (14) for integrating the data managed by the configuration module (10) with ERP data.

14. A system (1) as claimed in claim 11, and comprising a software generation module (15) for generating the product control software of a selected path (6) or configuration.

15. A system (1) as claimed in claim 1, and comprising a PLM module (16) for generating specific configuration views for each company division, the PLM module generating a first view for Sales, which simply shows the product configuration as a whole in functional terms, with no reference to the document structure underlying individual functional features; a second view for Design, which shows the product configuration as a whole in terms of functions; and a third view for Production, which shows the specific customer-requested product configuration.

16. A system (1) as claimed in claim 1, and which provides for graphically displaying fixed parts, which are independent of configuration choices, and variable parts, which are dependent on configuration choices.

17. A system (1) as claimed in claim 1, wherein the succession of product characteristics is expressed as a succession of minimum functional parts, each of which refers to an item/characteristic of the product and is parametered internally.

18. A system (1) as claimed in claim 17, wherein each minimum functional part is assigned attributes to physically represent the product, relationships by which to navigate company know-how, constraints to ensure creation of consistent configurations at all times, and documents customizable as a function of the configuration.

19. A product configuration system (1) comprising:
a memory device (2), in which possible product manufacturing alternatives are stored;
a display device (3) for graphically displaying possible product configurations in the form of a product tree (4) extending vertically downwards and comprising a set of paths, each of which corresponds to a possible product configuration;
a selection device (5) for selecting a product configuration by selecting a path (6) on the product tree (4);
a configuration module (10), in turn comprising the display device (3) and the selection device (5);
a technical documentation module (11) for generating the technical documentation relating to a selected path (6) or configuration; and
a CAD connection module (12) for integrating the data of the configuration module (10) with CAD data;
wherein the product tree (4) has a common start or input point (7) arranged at the top of the product tree (4) and a common end or output point (8) arranged at the bottom of the product tree (4) so as each path corresponding to a possible product configuration starts at the same common start point (7) and ends at the same common end point (8);
wherein the product tree (4) comprises a plurality of vertical levels, each of which corresponds to a product characteristic (I–VI) which can be selected from a number of alternatives (A–F);
wherein in a vertical level the alternatives for the same product characteristic (I–VI) are graphically represented by vertical lines arranged parallel each other;
wherein each vertical level has a top horizontal line and a bottom horizontal line, which bounds the vertical level; and
wherein two adjacent vertical levels are graphically connected by a single vertical line connecting the bottom horizontal line of the upper level and the top horizontal line of the lower level.

20. A system (1) as claimed in claim 19, and comprising a CRM module (13) for memorizing the development of each product handled by the configuration module (10).

21. A system (1) as claimed in claim 19, and comprising an ERP connection module (14) for integrating the data managed by the configuration module (10) with ERP data.

22. A system (1) as claimed in claim 19, and comprising a software generation module (15) for generating the product control software of a selected path (6) or configuration.

23. A product configuration system (1) comprising:
a memory device (2), in which possible product manufacturing alternatives are stored;
a display device (3) for graphically displaying possible product configurations in the form of a product tree (4) extending vertically downwards and comprising a set of paths, each of which corresponds to a possible product configuration;
a selection device (5) for selecting a product configuration by selecting a path (6) on the product tree (4); and
a PLM module (16) for generating specific configuration views for each company division, the PLM module generating a first view for Sales, which simply shows the product configuration as a whole in functional terms, with no reference to the document structure underlying individual functional features; a second view for Design, which shows the product configuration as a whole in terms of functions; and a third view for Production, which shows the specific customer-requested product configuration;
wherein the product tree (4) has a common start or input point (7) arranged at the top of the product tree (4) and a common end or output point (8) arranged at the bottom of the product tree (4) so as each path corresponding to a possible product configuration starts at the same common start point (7) and ends at the same common end point (8);
wherein the product tree (4) comprises a plurality of vertical levels, each of which corresponds to a product characteristic (I–VI) which can be selected from a number of alternatives (A–F);
wherein in a vertical level the alternatives for the same product characteristic (I–VI) are graphically represented by vertical lines arranged parallel each other;
wherein each vertical level has a top horizontal line and a bottom horizontal line, which bounds the vertical level; and
wherein two adjacent vertical levels are graphically connected by a single vertical line connecting the bottom horizontal line of the upper level and the top horizontal line of the lower level.

* * * * *

UNITED STATES PATENT AND TRADEMARK OFFICE
CERTIFICATE OF CORRECTION

PATENT NO.       : 7,127,313 B2                                               Page 1 of 1
APPLICATION NO.  : 11/038467
DATED            : October 24, 2006
INVENTOR(S)      : Neri It is certified that error appears in the above-identified patent and that said Letters Patent is hereby corrected as shown below:

Title page, item (73)    Assignee: should read --Tree's Co. S.r.l., Casalecchio di ~~Reao~~ Reno (IT).--

Signed and Sealed this

Sixth Day of February, 2007

JON W. DUDAS
*Director of the United States Patent and Trademark Office*